United States Patent [19]

Jonas et al.

[11] Patent Number: 4,888,243
[45] Date of Patent: Dec. 19, 1989

[54] PROCESS FOR ANTISTATIC TREATMENT OF PLASTIC MOULDINGS

[75] Inventors: Friedrich Jonas, Aachen; Werner Waldenrath, Cologne, both of Fed. Rep. of Germany

[73] Assignee: Bayer Aktiengesellschaft, Leverkusen, Fed. Rep. of Germany

[21] Appl. No.: 219,104

[22] Filed: Jul. 14, 1988

[30] Foreign Application Priority Data

Aug. 1, 1987 [DE] Fed. Rep. of Germany ....... 3725575

[51] Int. Cl.$^4$ .................. B05D 3/02; B05D 5/12; B32B 9/04
[52] U.S. Cl. ................ 428/411.1; 427/121; 427/322; 427/354; 427/379; 427/393.5; 427/412.1

[58] Field of Search ............ 427/121, 322, 412.1, 427/393.5, 354, 379; 428/411.1

[56] References Cited

U.S. PATENT DOCUMENTS 4,617,228 10/1986 Newman et al. ............... 427/121 X
4,710,401 12/1987 Warren et al. ..................... 427/121

*Primary Examiner*—Michael Lusignan
*Attorney, Agent, or Firm*—Sprung Horn Kramer & Woods

[57] ABSTRACT

The invention relates to a process for the preparation of plastic mouldings, preferably plastic films, antistatically treated with a transparent layer of polypyrrole; the process is characterized by a certain combination of special measures which are coordinated with one another.

9 Claims, No Drawings

PROCESS FOR ANTISTATIC TREATMENT OF PLASTIC MOULDINGS

The invention relates to a process for treatment of plastic mouldings, in particular plastic films, by application of a transparent layer of electrically conductive organic conductors, preferably polypyrrole, to the surface of plastic mouldings.

The known organic plastics, such as polyesters, polycarbonates, polyamides, polyethylenes, polypropylenes and the like, are electrical insulators; their specific resistance is between $10^{10}$ and $10^{18}$ Ω.cm. Mouldings produced from these plastics, for example films, have the disadvantage that they are easily electrostatically charged. In order to avoid this charging, various processes for antistatic treatment of plastics have been proposed. These are, on the one hand, the processes in which the antistatics (compounds with electrical conductivity) are incorporated into the plastics compositions (see, for example, DE-OS (German Published Specification No. 3,409,462). These processes generally have the disadvantage, however, that the processing and/or physical properties (for example impact and notched impact strength and elasticity properties) of the plastics are impaired by them. Transparent plastic films such as are required, for example, for packaging sensitive electrical or electronic equipment cannot be prepared by this process.

On the other hand, there are the processes in which the antistatics are applied only to the surface of the mouldings produced from the plastics. Widely varying antistatics have been proposed for use in these processes; for example ethoxylated fatty amines, phosphoric and sulphuric acid esters of long-chain alcohols and alkylene polyglycol ethers and salts of long-chain paraffinsulphonic acids (see, for example, DE-OS (German Published Specification) No. 3,435,841); or charge-transfer complexes which are derived, for example, from tetrathiofulvalene or tetracyanoquinodimethane (see DE-OS (German Published Specification) No. 3,440,914); or by polypyrrole produced in situ from pyrrole on the surfaces of plastics (see, for example, Nos. EP-A-0,206,133, EP-A-0,206,414, DE-OS (German Published Specification) No. 3,321,281, DE-OS (German Published Specification) No. 3,544,957 and U.S. Pat. No. 4,604,427). However, these processes for antistatic treatment of the surface of moulded articles of plastics also have serious disadvantages. The antistatics based on ethoxylated amines, phosphoric and sulphuric acid esters of longchain alcohols and the like have the disadvantage that their antistatic activity is associated with quite specific conditions, such as, for example, a sufficiently high atmospheric humidity. The charge-transfer complexes have the disadvantage that they are too sensitive to heat and that the plastic mouldings treated with them, for example films, therefore lose their antistatic properties when exposed to heat, such as occurs, for example, during deep-drawing of films to produce packaging components.

The various processes for antistatic treatment of plastic mouldings with layers of electrically conductive polypyrroles applied to the surface have the following disadvantages:

According to the process described in No. EP-A-0,206,414, porous and, according to the process described in U.S. Pat. No. 4,604,427, non-porous plastic mouldings are first impregnated with a pyrrole solution; the pyrrole applied to the surface is then polymerized by treatment of the plastic mouldings with a solution of an oxidizing agent, for example an aqueous $FeCl_3$ solution, to give polypyrrole. This process cannot be carried out on an industrial scale because the oxidation bath is already rendered useless after a short period of use by black precipitates of polypyrrole formed from the pyrrole which has been washed out. On further use of the bath, the precipitates settle on the surface of the plastic. In order to avoid these spots, it is necessary to change the oxidation bath after only a short period of use.

NO. EP-A-0,206,133 and DE-OS (German Published Specification) Nos. 3,321,281 and 3,544,597 describe a process for producing conductive polypyrrole layers on plastic mouldings, according to which the mouldings are first treated with a solution of the oxidizing agent and then with pyrrole in the form of a vapour or in dissolved form. The disadvantage of this process is that no firmly adhering, permanently antistatic coatings on the plastic mouldings are obtained, or that the plastic mouldings obtained by the process discolour when heated to higher temperatures.

In the process described in DE-OS (German Published Specification) No. 3,634,226, oxidizing agents; pyrrole and water-soluble binders are applied together to the surface of the plastic. No transparent antistatic coatings on plastic mouldings are obtainable by this procedure.

It has now been found that it is possible to produce a transparent, permanently antistatic layer of polypyrrole on the surface of plastic mouldings on an industrial scale if a certain combination of process measures coordinated with one another are used to apply the polypyrrole to the plastic mouldings; in particular, if the plastic moulding to be given antistatic treatment is first coated with a solution of an oxidizing agent in an organic solvent and not—as previously—with an aqueous solution of the oxidizing agent and if an organic binder which is insoluble or only sparingly soluble in water is used in this solution, instead of the water-soluble binders previously used; the organic solvent is removed from the coating; the plastic moulding coated with the oxidizing agent is treated with a solution of pyrrole in an organic solvent which dissolves neither the material of the plastic to be given antistatic treatment nor the binder applied to the surface of the plastic or the oxidizing agent; after this treatment also, the organic solvent is removed from the layer on the moulding and the coating thus obtained is finally freed from inorganic compounds which are not bound as polymers, for example unused oxidizing agent, by washing with water.

Permanently antistatically treated plastic mouldings, for example plastic films, provided with a transparent coating can be prepared on an industrial scale by this combination of coordinated measures. Surprisingly, it has been found that the antistatic properties of the plastic mouldings thus obtained are reduced only insignificantly even under exposure to mechanical stresses and/or heat, such as occurs, for example, in cold forming or deep-drawing of films, and that plastic films still have the desired antistatic properties even in the deformed zones. It has furthermore been found that thermal aftertreatment of the mouldings which have been given an antistatic treatment according to the invention surprisingly leads to an increase in the surface conductivity Discoloration of the plastic mouldings on heating likewise does not occur.

The invention thus relates to a process for the preparation of plastic mouldings, preferably plastic films, antistatically treated with a transparent layer of polypyrrole; the process is characterized in that 1. the plastic moulding is coated with a solution which contains an oxidizing agent suitable for oxidative polymerization of pyrrole and an organic polymeric binder which is insoluble or at least only sparingly soluble in water in an organic solvent;
2. the organic solvent is removed from the coating;
3. the coated moulding is treated with a solution of pyrrole in an organic solvent in which the plastic to be coated and the substances applied to it, oxidizing agents and organic polymeric binders, are insoluble;
4. the organic solvent is removed from the coating;
5. the coated plastic moulding is washed with water to remove inorganic compounds which are not bound as polymers; and
6. the coated plastic moulding is dried and, if appropriate,
7. subjected to thermal after-treatment to increase the adhesiveness of the antistatic layer.

The process according to the invention is particularly suitable for the preparation of antistatically treated plastic mouldings. Because of their transparency and their permanent antistatic properties, which are also stable under exposure to mechanical stresses and heat, these plastic films can advantageously be used to prepare transparent packaging components by deep-drawing.

The individual process steps are described below in more detail:

Re 1.:

Suitable oxidizing agents for the oxidative polymerization of pyrrole are known and are described, for example, in the publication J. Am. Chem. Soc. 85, 454 (1963). $AlCl_3$, $AlCl_3$-$CuCl_2$, iron(III) salts, such as $FeCl_3$ and $Fe(ClO_4)_3$, $SbCl_5$, $MoCl_5$, $H_2SO_5$ and $K_2S_2O_8$ are particularly suitable for carrying out the process according to the invention; mixtures of the compounds mentioned can also be used. $FeCl_3$ is preferably employed.

For carrying out the process on an industrial scale salts of trivalent iron which are derived from organic acids or inorganic acids containing organic radicals are preferably used for the oxidative polymerization of pyrrole.

If these iron salts are used, corrosion of the vessels and components of the apparatus in which the plastic mouldings are coated according to the invention is avoided. Corrosion leads to considerable difficulties, and in particular not only to damaged vessels and components of the apparatus, but also to an impairment in quality of the polypyrrole coating by the corrosion products which pass into the coating solution.

Examples which may be mentioned of iron(III) salts of inorganic acids with organic radicals which are preferably used are the iron(III) salts of sulphuric acid half-esters of $C_1$-$C_{20}$-alkanols, for example the Fe(III) salt of laurylsulphate.

Examples which may be mentioned of iron(III) salts of organic acids are: the Fe(III) salts of $C_1$ $14$ $C_{20}$-alkyl sulphonic acids, such as of methane- and dodecanesulphonic acid; aliphatic $C_1$-$C_{20}$-carboxylic acids, such as of 2-ethylhexylcarboxylic acid; aliphatic perfluorocarboxylic acids, such as of trifluoroacetic acid and perchlorooctanoic acid; aliphatic dicarboxylic acids, such as of oxalic acid, and particularly of aromatic sulphonic acids which are optionally substituted by $C_1$-$C_{20}$-alkyl groups, such as of benzenesulphonic acid, p-toluenesulphonic acid and dodecylbenzenesulphonic acid.

Mixtures of these abovementioned Fe(III) salts of organic acids can also be used.

Suitable organic polymeric binders which are insoluble or at least only sparingly soluble in water are, for example, synthetic organic polymers which are soluble in organic solvents, such as polyvinyl acetate, polycarbonate, polyvinylbutyral, polyacrylate, polymethacrylate, polystyrene, polyacrylonitrile, polyvinyl chloride, polybutadiene, polyisoprene, polyether, polyester and silicones; copolymers which are soluble in organic solvents, such as styrene/acrylate, vinyl acetate/acrylate and ethylene/vinyl acetate copolymers, can also be used. Preferred binders are polyvinyl acetate, polycarbonate, poly(meth)acrylate and copolymers of the monomers on which these polymers are based.

The choice of organic solvent for the preparation of the solution depends on the material to be coated and the envisaged binder. Suitable solvents must readily dissolve the binder and oxidizing agent, but must not cause damage to the plastic moulding to be coated. Examples which may be mentioned of solvents with the required properties are: aliphatic alcohols, such as methanol, ethanol and isopropanol; aliphatic ketones, such as acetone, methyl ethyl ketone and cyclohexanone; aliphatic carboxylic acid esters, such as methyl and butyl acetate; aromatic hydrocarbons, such as toluene and xylene; halogenated hydrocarbons, such as dichloromethane and dichloroethane, and aliphatic nitriles, such as acetonitrile.

The individual solvents can also be used as such or as a mixture with one another. In practice, for example, mixtures of acetone and isopropanol (weight ratio 1:2) have proved suitable for coating polycarbonate mouldings.

The content of oxidizing agent in the coating solutions is in general 10 to 200% by weight, based on the binder used. The total concentration of solids (oxidizing agent and binder) is in general between 5 and 50% by weight, based on the total weight of the solution. The total concentration of the solutions depends on the coating process used.

Suitable processes for coating the plastic mouldings to be antistatically treated are spraying, knife-coating, brushing and printing (for example by gravure printing).

The dry film thickness, that is to say the layer thickness of the coating applied after drying, is advantageously 0.1 to 3.0 μm. Thicker layers can have a adverse effect on the transparency and in some cases also even an adverse effect on the electrical conductivity of the coatings.

The plastic mouldings to be antistatically treated according to the invention can be produced from the following plastics: polycarbonates, polyamides, polyurethanes, polyureas, polyesters, polyethers, polypropylene, polyoxyethylene, polyvinyl chloride, polymethacrylate, polystyrene or cellulose ester and ether.

Re 2.:

The organic solvent can be removed from the coating by simple evaporation or by heating the layer, if appropriate, in vacuo. Re 3.:

The treatment of the coated and dried plastic mouldings with the pyrrole solutions is in general carried out at room temperature, but can also be carried out at lower or higher temperatures. The choice of solvents for the pyrrole in general depends on the plastic from which the mouldings are produced and the binder used. The solvent must dissolve neither the plastic to be coated nor the solvent applied nor the oxidizing agent. Solvents which meet these requirements are, for example, aliphatic hydrocarbons, such as n-hexane; aromatic hydrocarbons, such as benzene or toluene; or fluorinated hydrocarbons, such as 1,1,2-trichlorotrifluoroethane. Mixtures of these solvents can also be used. The coated materials can be treated with the pyrrole solution by being dipped into the pyrrole solution or sprayed with the pyrrole solution. The treatment time is in general less than 1 minute. In most cases, an action time of a few seconds is sufficient.

The concentration of the pyrrole in the solutions is preferably 1 to 50% by weight, and preferably 2 to 10% by weight, based on the weight of the solvent.

Instead of pyrrole, it is also possible to use other polymerizable 5-ring heterocycles, such as thiophenes, furans or substituted pyrroles, or mixtures of these compounds.

Re 4.:

The solvent is removed by evaporation, if appropriate at elevated temperature and/or under reduced pressure.

Re 5.:

The ready-coated and dried plastic mouldings are then washed with water to remove the inorganic compounds which are not bound as polymers, for example the unused oxidizing agent. In particular, it has been found that these inorganic compounds which are not bound as polymers can lead to degradation of the polymer, especially at higher temperatures. The washing out operation has the effect that no discoloration of the transparent antistatic coating on the plastic mouldings occurs even under exposure to heat.

Because of the transparency and resistance of the antistatic coating towards exposure to mechanical stresses and heat, the plastic mouldings obtainable by the process according to the invention, in particular the plastic films obtainable by the process according to the invention, are particularly suitable for packaging electrostatically sensitive electronic components and for preparing packaging components by deep-drawing.

EXAMPLE 1

A solution of 0.6 g of $FeCl_3$, 1 g of polyvinyl acetate and 19 g of acetone is knife-coated onto a polyamide film with a hand coater (wet film thickness: about 25 $\mu$m, corresponding to a dry film thickness of 1–2 $\mu$m). After the solvent has been evaporated off (drying), the coated film is dipped for 2 seconds into a 5% strength solution of pyrrole in a (1:1) n-hexane/toluene mixture. After drying at room temperature, the coated film is then washed with running water until the washing water contains practically no more $Fe^{3+}$ mions.

A transparent film is obtained; surface resistance $R_S$ of the film: $\sim 10^4$ $\Omega$.

An equivalent film was obtained when 1.0 g of $FeCl_3 \times 6H_2O$ was used instead of the 0.6 g of $FeCl_3$.

EXAMPLE 2

(a) A solution of 0.5 g of $FeCl_3$, 1 g of polyvinyl acetate, 6 g of acetone and 13 g of isopropanol is knife-coated onto a polycarbonate cast film by means of a hand coater (wet film thickness: about 25 $\mu$m, corresponding to a dry film thickness of 1–2 $\mu$m). Further treatment of the coated film is carried out by the procedure described in Example 1.

A transparent film is obtained; surface resistance $R_S$ of the film: $\sim 10^4$ $\Omega$.

(b) The film was heated at 220° C. for 30 seconds. The adhesiveness of the polypyrrole coating was increased by this thermal after-treatment; the surface resistance of the film was increased by this treatment only to $\sim 10^5 \Omega$.

(c) In ageing experiments with the film which had not been heated (storage for 24 hours at 100° C.), no change in colour could be detected in the film. However, if the washing step was dispensed with in the production of the film, the film was considerably darker in colour after ageing.

(d) The film which had not been heated was stretched in a ratio of 1:3 at room temperature. The surface resistance of the film rose only to $\sim 10^6$ $\Omega$ by the exposure to mechanical stresses. Since the surface resistance of antistatically treated films must lie in the range from $10^2$ to $10^9$ $\Omega$, the antistatic treatment of the film still fully meets the requirements imposed in practice even after exposure to mechanical stresses.

(e) The film which had not been heated was heated to 200° C. and at the same time deformed by deep-drawing. Even at the deformed points, the surface resistance of the film was still $10^7$ $\Omega$; that is to say even the deformed (deep-drawn) points still had the values required for antistatic treatment.

Example 3

(a) A polyester film and (b) a polyethylene film were coated by the procedure described in Example 2a.

A transparent film was obtained in both cases;
$R_S$ of film (a): $\sim 10^4$ $\Omega$
$R_S$ of film (b): $\sim 10^5$ $\Omega$ Example 4

A solution of 0.6 g of $FeCl_3$ g of polymethylmethacrylate and 25 g of acetone is knife-coated onto a polycarbonate film by means of a hand coater (wet film thickness: 30 $\mu$m, corresponding to a dry film thickness of 1–2 $\mu$m). The coated film is further treated by the procedure described in Example 2a.

A transparent film is obtained; surface resistance $R_S$ of the film: $5 \times 10^4$ $\Omega$ Example 5

A solution of 1.0 g of $FeCl_3$, 2.0 g of a commercially available polycarbonate based on bisphenol A, 38 g of methylene chloride and 2 g of acetonitrile is in each case knife-coated onto: (a) a polyamide film, (b) a polyester film (wet film thickness: 25 $\mu$m, corresponding to a dry film thickness of 1–2 $\mu$m).

After evaporating off the solvent, the films, as described in Example 1, are treated with pyrrole solution, dried, washed with water and dried.

Transparent antistatic films are obtained in both cases;
$R_S$ of film (a): $10^5$ $\Omega$
$R_S$ of film (b): $10^6$ $\Omega$ Example 6

A solution of 1.0 g of Fe(III) dodecylbenzenesulphonate, 1 g of polyvinyl acetate, 12 g of isopropanol and 6 g of acetone is knife-coated onto a polycarbonate film with a hand coater (wet film thickness: about 25 $\mu$m, corresponding to a dry film thickness of 1–2 $\mu$m). After evaporating off the solvent (drying), the coated film is dipped for 2 seconds into a 5% strength solution of pyrrole in a (1:1) n-hexane/toluene mixture. After drying at room temperature, the coated film is then washed with running water until the washing water contains practically no more $Fe^{3+}$ ions.

A transparent film is obtained; surface resistance $R_S$ of the film: $2 \times 10^4 \Omega$ A sample of the film was brought into contact with a hot metal plate at 180° C. for 5 seconds. The surface resistance of the film drops by the heat treatment to $R_S$: $0.3 \times 10^4 \Omega$ An equivalent film was obtained when the same amount of Fe(III) p-toluenesulphonate was used instead of the Fe(III) dodecylbenzenesulphonate.

What is claimed is:

1. In the process for the preparation of a plastic moulding antistatically treated with a layer of polypyrrole, wherein the plastic moulding is coated with a layer of polypryyole, the improvement which comprises carrying out the treatment in the following manner:
    1. coating the plastic moulding with an organic solvent solution which contains
        (a) an effective amount of oxidizing agent suitable for oxidative polymerization of pyrrole and
        (b) an effective amount of polymeric binder which is insoluble or at least only sparingly soluble in water;
    2. removing the organic solvent from the coating;
    3. treating the coated moulding with a solution of pyrrole in an organic solvent in which the plastic to be coated and the substances applied to it, the oxidizing agent and the organic polymeric binder, are insoluble;
    4. removing the organic solvent from the coating;
    5. washing the coated plastic moulding with water to remove inorganic compound which are not bound as polymers; and
    6. drying the coated plastic moulding and, optionally,
    7. subjecting it to thermal after-treatment.

2. The process of claim 1, wherein the plastic moulding to be antistatically treated is a plastic film.

3. The process of claim 1, wherein polyvinyl acetate, poly(meth)acrylate, polycarbonates or copolymers of the monomers on which these polymers are based are used as the organic polymeric binder which is insoluble in water.

4. The process of claim 1, wherein polyvinyl acetate or polymethyl methacrylate is used as the organic polymeric binder which is insoluble in water.

5. The process of claim 1, wherein a salt of trivalent iron is used as the oxidizing agent.

6. The process of claim 5, wherein the salt of trivalent iron is $FeCl_3$ or is a Fe-III-salt which is derived from an organic acid or an inorganic acid containing an organic radical.

7. The process of claim 6, wherein the salt of trivalent iron is derived from an aromatic sulphonic acid which is optionally substituted by $C_1-C_{20}$-alkyl groups.

8. The process of claim 1, wherein the coating thickness of the coating applied is 0.1 to 3.0 μm after drying.

9. An antistatically treated plastic moulding prepared by the process of claim 1.

* * * * *